United States Patent
Yamaki

(10) Patent No.: US 8,625,629 B2
(45) Date of Patent: Jan. 7, 2014

(54) TRANSMISSION/RECEPTION SYSTEM AND TRANSMISSION/RECEPTION METHOD

(75) Inventor: Norimitsu Yamaki, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/636,564

(22) PCT Filed: Feb. 18, 2011

(86) PCT No.: PCT/JP2011/053449
§ 371 (c)(1),
(2), (4) Date: Sep. 21, 2012

(87) PCT Pub. No.: WO2012/014508
PCT Pub. Date: Feb. 2, 2012

(65) Prior Publication Data
US 2013/0010806 A1    Jan. 10, 2013

(30) Foreign Application Priority Data
Jul. 30, 2010   (JP) .................................. 2010-172043

(51) Int. Cl.
*H04L 12/66*   (2006.01)

(52) U.S. Cl.
USPC ....................................................... 370/463

(58) Field of Classification Search
USPC ....................................................... 370/463
See application file for complete search history.

(56) References Cited

U.S. PATENT DOCUMENTS

| | | | | |
|---|---|---|---|---|
| 5,327,275 A * | 7/1994 | Yamane et al. | ................... | 398/2 |
| 5,774,528 A | 6/1998 | Bogner et al. | | |
| 7,389,043 B2 * | 6/2008 | Bernier et al. | ................... | 398/7 |
| 2007/0189155 A1 | 8/2007 | Shioda et al. | | |

FOREIGN PATENT DOCUMENTS

| | | |
|---|---|---|
| JP | 4-235426 A | 8/1992 |
| JP | 10-135923 A | 5/1998 |
| JP | 11-74856 A | 3/1999 |
| JP | 2000-047892 A | 2/2000 |
| JP | 2002-262375 A | 9/2002 |
| JP | 2007-221259 A | 8/2007 |

OTHER PUBLICATIONS

Office Action dated Nov. 21, 2012 issued by the Canadian Intellectual Property Office in counterpart Canadian Application No. 2,791,364.

* cited by examiner

*Primary Examiner* — Mark Rinehart
*Assistant Examiner* — Maharishi Khirodhar
(74) *Attorney, Agent, or Firm* — Sughrue Mion, PLLC

(57) ABSTRACT

Provided is a transmitting and receiving system and method in which a transmitting and receiving device mounted on an operation system unit can process a signal received from an equipment connected to a standby system unit and a signal to be transmitted to the equipment connected to the standby system unit.

A data signal and a control signal to be transmitted to a receiving device of the operation system unit are multiplexed by a parallel/serial conversion using a multiplexer. The signals are transmitted to the operation system unit as a serial received signal. The signal is demultiplexed by a serial/parallel conversion using a demultiplexer of the operation system unit. Further, a data signal and a control signal to be transmitted to the equipment connected to the standby system unit are multiplexed by a parallel/serial conversion using a multiplexer. The signals are transmitted from the operation system unit to the standby system unit as a serial signal to be transmitted. The signal is demultiplexed by a serial/parallel conversion using a demultiplexer of the standby system unit.

10 Claims, 12 Drawing Sheets

TRANSMISSION/RECEPTION SYSTEM AND TRANSMISSION/RECEPTION METHOD

CROSS REFERENCE TO RELATED APPLICATIONS

This application is a National Stage of International Application No. PCT/JP2011/053449 filed on Feb. 18, 2011, which claims priority from Japanese Patent Application No. 2010-172043, filed on Jul. 30, 2010, the contents of all of which are incorporated herein by reference in their entirety.

TECHNICAL FIELD

The present invention relates to a transmitting and receiving system and a transmitting and receiving method for transmitting and receiving a data signal and a control signal between an operation system unit and a standby system unit.

BACKGROUND ART

In an exchange (hereinafter, referred to as a "unit"), the parameter or the like of the unit is sometimes set according to a recommended standard 232 version C (RS232-C) serial interface complying with the RS232-C. Further, there is a structure in which a printer having the RS232-C serial interface is connected to the unit.

Constructing such a unit as a duplexed unit including an operation system unit and a standby system unit sometimes increases the reliability. In the duplexed unit, when a malfunction occurs in the operation system unit, the standby system unit is newly used as the operation system unit. At that time the printer that has been connected to the operation system unit according to the RS232-C serial interface needs to be connected to the standby system unit without a human operation.

Patent Literature 1 describes a technique in which an operation system switch is provided with a first data converting part and the like, a backup system switch is provided with a second data converting part and the like, and the first data converting part and the second data converting part are bi-directionally connected to each other through a first transfer line, a second transfer line, and a third transfer line. The first transfer line bi-directionally transfers serial data. The second transfer line bi-directionally transfers a clock. The third transfer line bi-directionally transfers a frame pulse.

Patent Literature 2 describes a technique in which a data transfer device on the transmitting side performs a parallel/serial conversion by combining a parallel status control signal with a parallel data signal in order to convert the signals into a serial signal. The serial signal, a clock signal, and a synchronization signal are transmitted to a data transfer device on the receiving side.

CITATION LIST

Patent Literatures

{PTL 1} JP-A-2002-262375 (paragraphs {0013} to {0015} and the like)
{PTL 2} JP-A-11-074856 (paragraph {0013} and the like)

SUMMARY OF INVENTION

Technical Problem

In the technique described in Patent Literature 1, a transmitting and receiving device connected to an operation system unit (operation system switch) can process the signal received from an equipment connected to the operation system unit (operation system switch) and the signal to be transmitted to the equipment connected to the operation system unit (operation system switch). However, the transmitting and receiving device mounted on the operation system unit (operation system switch) cannot process the signal received from an equipment connected to a standby system unit (backup system switch) and the signal to be transmitted to the equipment connected to the standby system unit (backup system switch). Neither does the technique described in Patent Literature 2.

If such a process can be done, the equipment connected to the previous operation system unit can continuously be used without being connected to the new operation system unit (the previous standby system unit) when the standby system unit switches places with the operation system unit. Thus, it is not necessary to switch the destination every time when the operation system units switch places with each other. This improves the maintainability.

In light of the foregoing, the present invention is aimed to provide a transmitting and receiving system and a transmitting and receiving method in which a transmitting and receiving device mounted on the operation system unit can process the signal received from the equipment connected to the standby system unit and the signal to be transmitted to the equipment connected to the standby system unit.

Solution to Problem

According to the present invention, there is provided a transmitting and receiving system for transmitting and receiving a data signal and a control signal between an operation system unit and a standby system unit which includes a multiplexer included in the operation system unit, a demultiplexer included in the operation system unit, a multiplexer included in the standby system unit, a demultiplexer included in the standby system unit, a circuit configured to perform a parallel/serial conversion on a data signal and a control signal using the multiplexer of the standby system unit to multiplex the signals in order to transmit the signals as a serial received signal from the standby system unit to the operation system unit, and configured to perform a serial/parallel conversion on the signal using the demultiplexer of the operation system unit to demultiplex the signal, the data signal and the control signal being to be received by the standby system unit from an equipment connected to the standby system unit and being to be transmitted to a receiving device in the operation system unit, and a circuit configured to perform a parallel/serial conversion on a data signal and a control signal using the multiplexer of the operation system unit to multiplex the signals in order to transmit, from the operation system unit to the standby system unit, the signals as a serial signal to be transmitted, and configured to perform a serial/parallel conversion on the signal using the demultiplexer of the standby system unit to demultiplex the signal, the data signal and the control signal being to be input from a transmitting device of the operation system unit and being to be transmitted to the equipment connected to the standby system unit.

According to the present invention, there is provided a transmitting and receiving method for transmitting and receiving a data signal and a control signal between an operation system unit and a standby system unit which includes performing a parallel/serial conversion on a data signal and a control signal using a multiplexer of the standby system unit to multiplex the signals in order to transmit the signals as a serial received signal from the standby system unit to the operation system unit, and configured to perform a serial/parallel conversion on the signal using a demultiplexer of the operation system unit to demultiplex the signal, the data signal and the control signal being to be received by the standby system unit from an equipment connected to the standby system unit and being to be transmitted to a receiving device in the operation system unit, and performing a parallel/serial conversion on a data signal and a control signal using a multiplexer of the operation system unit to multiplex the signals in order to transmit, from the operation system unit to the standby system unit, the signals as a serial signal to be transmitted, and configured to perform a serial/parallel conversion on the signal using a demultiplexer of the standby system unit to demultiplex the signal, the data signal and the control signal being to be input from a transmitting device of the operation system unit and being to be transmitted to an equipment connected to the standby system unit.

Advantageous Effects of the Invention

According to the present invention, there is provided a circuit configured to perform a parallel/serial conversion on a data signal and a control signal using the multiplexer of the standby system unit to multiplex the signals in order to transmit the signals as a serial received signal from the standby system unit to the operation system unit, and configured to perform a serial/parallel conversion on the signal using the demultiplexer of the operation system unit to demultiplex the signal, the data signal and the control signal being to be received by the standby system unit from an equipment connected to the standby system unit and being to be transmitted to a receiving device in the operation system unit, and a circuit configured to perform a parallel/serial conversion on a data signal and a control signal using the multiplexer of the operation system unit to multiplex the signals in order to transmit, from the operation system to the standby system unit, the signals as a serial signal to be transmitted, and configured to perform a serial/parallel conversion on the signal using the demultiplexer of the standby system unit to demultiplex the signal, the data signal and the control signal being to be input from a transmitting device of the operation system unit and being to be transmitted to the equipment connected to the standby system unit. Thus, the transmitting and receiving device mounted on the operation system unit can process the signal received from the equipment connected to the standby system unit and the signal to be transmitted to the equipment connected to the standby system unit.

REFERENCE SIGNS LIST

10: RS232-C connection equipment
11, 21: Input and output connector
12, 22: RS232-C transceiver
13, 23: Selector
14, 24: UART
15, 25: Multiplexer/demultiplexer
16, 26: Clock/frame head generating circuit
13-1, 13-2, 13-4: Gate
13-6, 13-7, 13-8: Gate
23-1, 23-2, 23-4: Gate
23-6, 23-7, 23-8: Gate
15-1, 15-4, 25-1, 25-4: Multiplexer
15-2, 15-3, 25-2, 25-3: Demultiplexer
13-3, 13-5, 23-3, 23-5: OR circuit

DESCRIPTION OF EMBODIMENTS

An embodiment of the present invention will be described in detail below with reference to the drawings. In a duplexed unit including RS232-C ports, when the operation system and the standby system are switched to each other, the equipment connected to the operation system RS232-C port needs to be switched to the standby system RS232-C port. Thus, a data communication between the operation system and the standby system is necessary.

A feature of the embodiment of the present invention is that multiplexing a control signal and data of the RS232-C can implement the communication of the control signal and the data between the operation system and the standby system, for example, using four signal lines.

A start/stop synchronization interface of the RS232-C includes five control signals and two data. The control signals include input signals including a carrier detect (DCD), a data set ready (DSR), and a clear to send (CTS), and output signals including a data terminal ready (DTR), and a request to send (RTS). The data include received data (RxD) and data to be transmitted (SxD).

Figure 1:
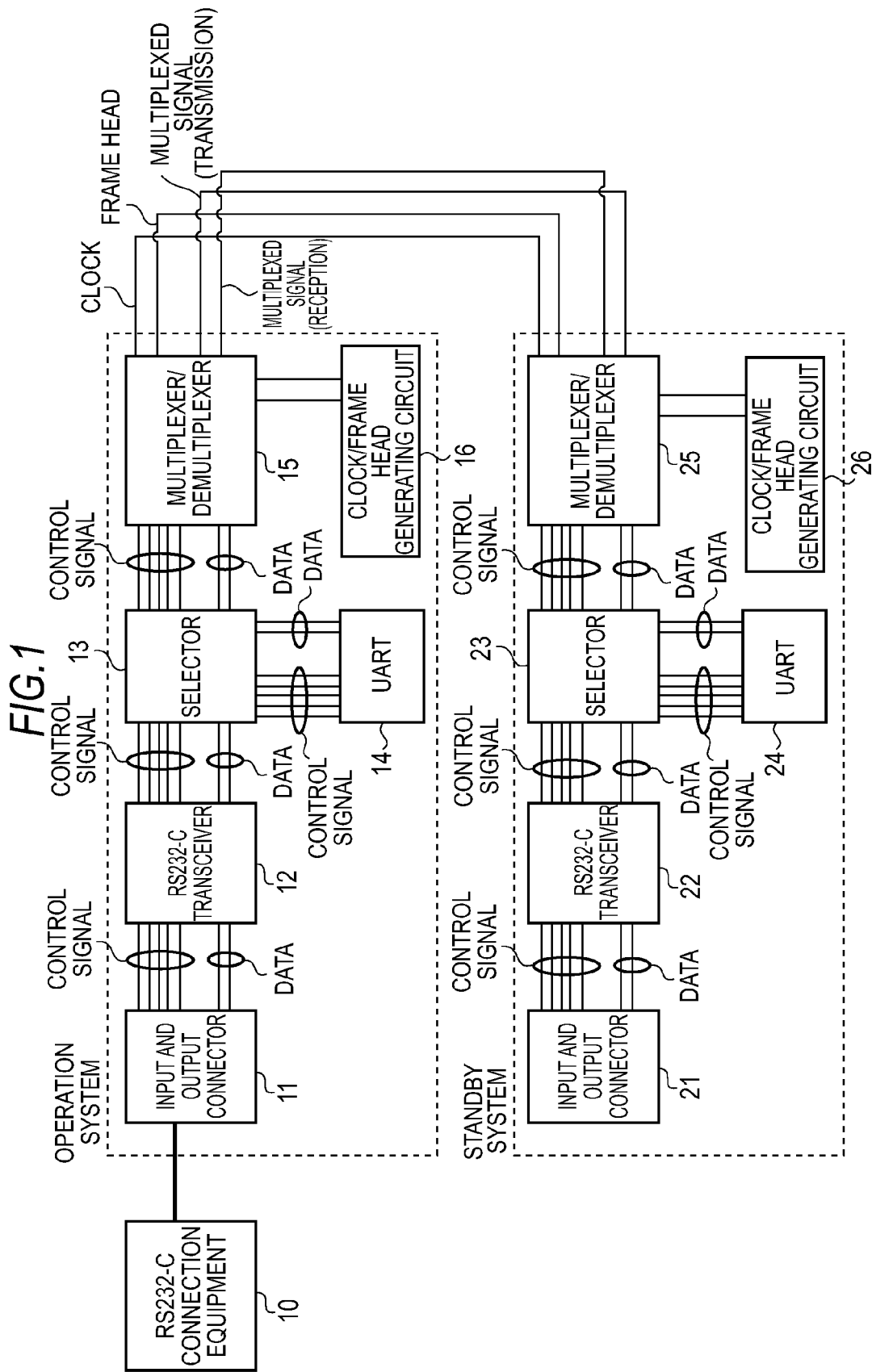
{FIG. 1} A block diagram illustrates an embodiment of a transmitting and receiving system according to an embodiment of the present invention.

According to the present embodiment, as illustrated in FIG. 1, the control signals and the data are multiplexed, converted into two signal lines and transmitted from the operation system unit to the standby system. For example, an 11.0592 MHz clock is used as a transmission clock. The 11.0592 MHz clock generates the baud rate of the RS232-C. A frame of the multiplexed signal corresponds to, for example, 18 clocks of 11.0592 MHz. A frame head signal indicating the head of the frame is generated. The control signal and the data is transferred between the operation system and the standby system using the clock, the frame head, the two multiplexed signals that totaled four lines.

EXAMPLES

Next, examples of the present invention will be described in detail with reference to the drawings. A duplexed unit includes an operation system and a standby system and the duplexed unit is normally operated by the operation system.

When a malfunction occurs in the operation system, the standby system operates the unit in place of the operation system. There are a hot standby scheme and a cold standby scheme for a duplexed unit. However, the present example is applied to the cold standby scheme. In the cold standby scheme, the standby system is on standby while the standby system is not activated, and the standby system is activated after the malfunction in the operation system.

FIG. 1 is a block diagram for illustrating a part of an RS232-C interface in the duplexed unit. The operation system and the standby system are the same unit so that the operation system and the standby system have the same structure. The operation system will be described below. However, the standby system is the same as the operation system.

The RS232-C interface normally includes a universal asynchronous receiver transmitter (UART) that performs a serial/parallel conversion according to an RS232-C transceiver start/stop synchronization scheme that satisfies the electric properties of the RS232-C.

In the example illustrated in FIG. 1, a selector 13 is added between an RS232-C transceiver 12 and a UART 14. The selector 13 determines whether the control signals and the data from the RS232-C transceiver 12 is connected to the UART 14 or a multiplexer/demultiplexer 15.

It is necessary to provide, at the subsequent stage of the selector 13, a multiplexer circuit for multiplexing the control signals and the data, and a demultiplexer circuit for separating the multiplexed data from the standby system. The multiplexer/demultiplexer 15 includes the multiplexer circuit and the demultiplexer circuit.

In that case, according to the present example, data signals and control signals are multiplexed by a parallel/serial conversion using a multiplexer circuit of the standby system. The signals are received from an RS-232C equipment and transmitted to a receiving device (UART) of the operation system. The standby system of the RS-232C equipment is connected to the above-mentioned standby system. The multiplexed signals are transmitted from the standby system to the operation system as a serial received signal. The serial received signal is demultiplexed by a serial/parallel conversion using the demultiplexer circuit of the operation system.

Further, data signals and control signals are multiplexed by a parallel/serial conversion using the multiplexer circuit of the operating system. The data signals and the control signals are input from the transmitting device (UART) of the operation system and transmitted to the RS-232C equipment connected to the standby system. The signals are transmitted from the operation system to the standby system as a serial signal to be transmitted. The transmitted signal is demultiplexed by a serial/parallel conversion using the demultiplexer circuit of the standby system.

Figure 2:
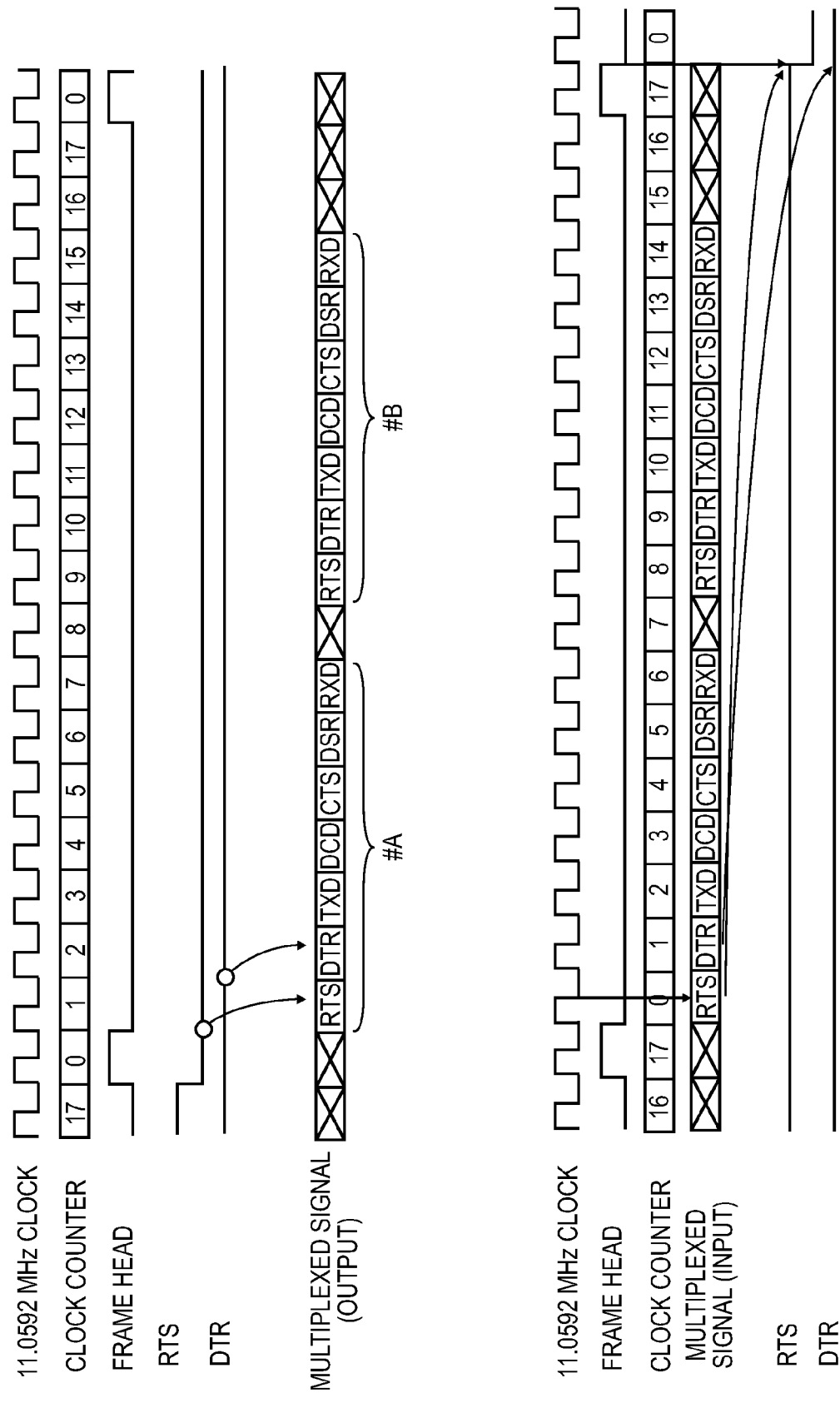
{FIG. 2} A view illustrates a signal of each part of the transmitting and receiving system illustrated in FIG. 1.

Further, a clock/frame head generating circuit 16 generates a clock for generating a multiplexed signal in the multiplexer/demultiplexer 15, and further generates a frame head for transmitting a head of the multiplexed signal frame to the standby system. The multiplexer/demultiplexer 15 generates a multiplexed signal as illustrated in FIG. 2 using the clock and the frame head. Further, the multiplexer/demultiplexer 15 separates a multiplexed data at the timing illustrated in FIG. 2.

In the signals illustrated at the upper side of FIG. 2, the clock, the frame head, and the multiplexed signal (output) are transmitted from the multiplexer/demultiplexer 15 of the operation system side to a multiplexer/demultiplexer 25 of the standby system side. An RTS and a DTR denote the control signals on the operation system side.

Further, in the signals illustrated at the lower side of FIG. 2, the clock, the frame head, and the multiplexed signal (input) are transmitted from the multiplexer/demultiplexer 25 of the standby system side to the multiplexer/demultiplexer 15 of the operation system side. An RTS and a DTR denote the control signals on the standby system side.

In such a circuit structure, the control signals and the data from an RS232-C connection equipment are multiplexed and transmitted and received through four signal lines. Note that a unit such as a printer (RS232-C connection equipment 10) is connected to the RS232-C interface as illustrated in FIG. 1.

In a normal operation by the operation system, the control signals and the data are input to the selector 13 through the RS232-C transceiver 12 of the operation system. In the normal operation, the selector 13 switches the connection to the UART 14. When the selector 13 connects to the UART 14, the circuit structure is the same as the above-mentioned normal circuit structure of the RS232-C.

Next, an operation when the operation system is switched to the standby system due to a malfunction will be described. Even if the operation system is switched to the standby system due to a malfunction, the RS232-C connection equipment is still connected to a connector of the operation system unless a human operation. The RS232-C connection equipment is connected to the selector 13 through the RS232-C transceiver 12 of the operation system as before. However, the selector 13 switches the connection to the multiplexer/demultiplexer 15 side. Thus, the RS232-C connection equipment is not connected to the UART 14 but to the multiplexer/demultiplexer 15 of the operation system.

The multiplexer/demultiplexer 15 receives a clock and a frame head from a clock/frame head generating circuit 26 of the standby system and generates multiplexed data according to the format illustrated in FIG. 2. In this case, the clock and the frame head generated in the clock/frame head generating circuit 26 of the standby system are used because it is necessary to output the data to the RS232-C connection equipment 10 using the clock of the currently-operating unit.

The multiplexer/demultiplexer 25 of the standby system separates the multiplexed signal which is generated in the multiplexer/demultiplexer 15 and transmits the signal to a selector 23. The selector 23 switches the connection to a UART 24 side. This establishes the connection between the UART 24 of the standby system and the RS232-C connection equipment 10. The same mechanism is used when the connection of the RS232-C connection equipment to the standby system is switched to the operation system.

The embodiment of the present invention is not limited to the above-mentioned example. The embodiment of the present invention can be applied to a duplexed unit including an RS232-C interface, for example, a unit to which a printer or a modem is connected.

Figure 3:
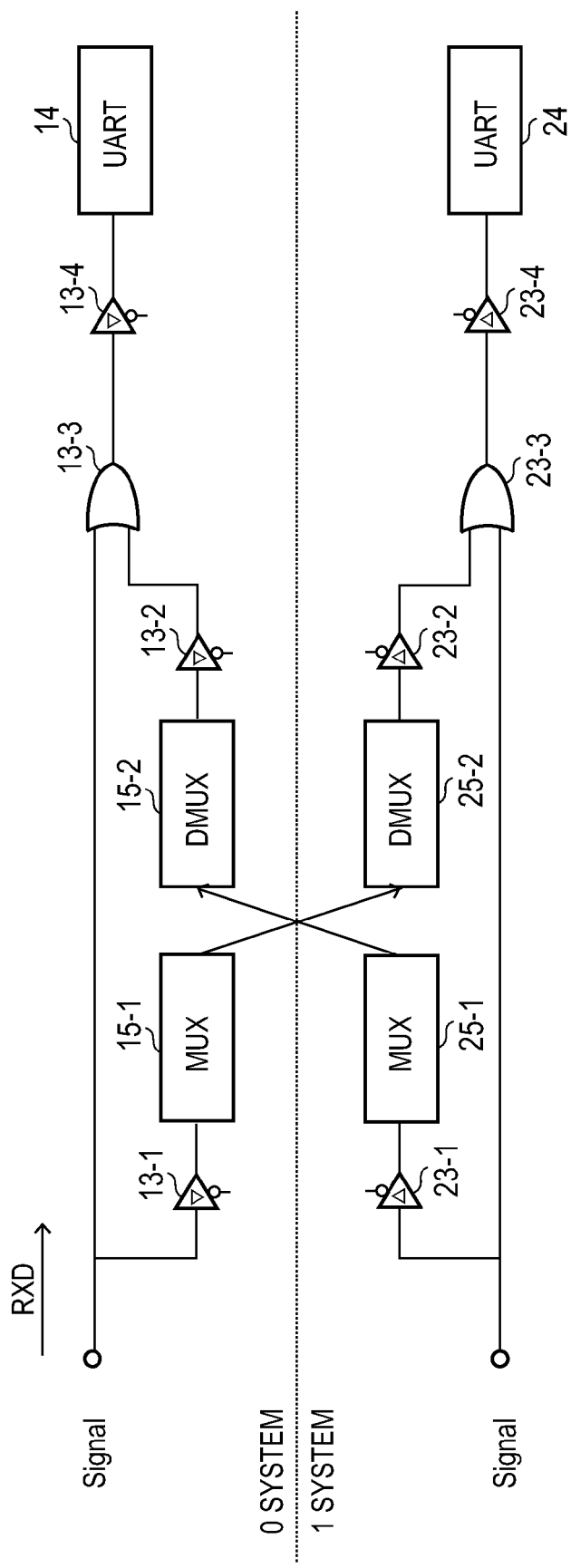
{FIG. 3} A view illustrates the connecting condition of a UART when the UART is on the receiving side.

Next, a method for duplexing the RS232-C in a duplexed unit that is an embodiment of the present invention will be described in detail. FIG. 3 illustrates a selector and a multiplexer/demultiplexer of each of a 0 system (for example, an operation system) and a 1 system (for example, a standby system) in detail. In other words, FIG. 3 is a view for illustrating the connecting condition of a UART when the UART is on the receiving side.

In the duplexed unit of this case, a unite (0 system) operates as an operation system (ACT) and the other unit (1 system) becomes a standby system (STBY). When a malfunction occurs in the operation system, the 0 system automatically becomes the standby system and the 1 system operates as the operation system. The standby system constantly monitors whether the operation system can operate. When detecting that the operation system stops the operation, the standby system automatically switches the system.

In the drawing, the numerical references 13-1, 13-2, and 13-4 denote gates in the selector of the 0 system, and the numerical reference 13-3 denotes an OR circuit. The numerical references 23-1, 23-2, and 23-4 denote the gates in the selector 13 of the 1 system, and the numerical reference 23-3 denotes an OR circuit. The numerical reference 15-1 denotes the multiplexer in the multiplexer/demultiplexer 15 of the 0 system and 15-2 denotes the demultiplexer. The numerical reference 25-1 denotes the multiplexer in the multiplexer/demultiplexer 25 of the 1 system and 25-2 denotes the demultiplexer.

As described above, the (two) control signals and the (two) multiplexed signals are transmitted and received between the multiplexer/demultiplexer 15-1 of the 0 system and the multiplexer/demultiplexer 25-1 of the 1 system.

Figure 4:
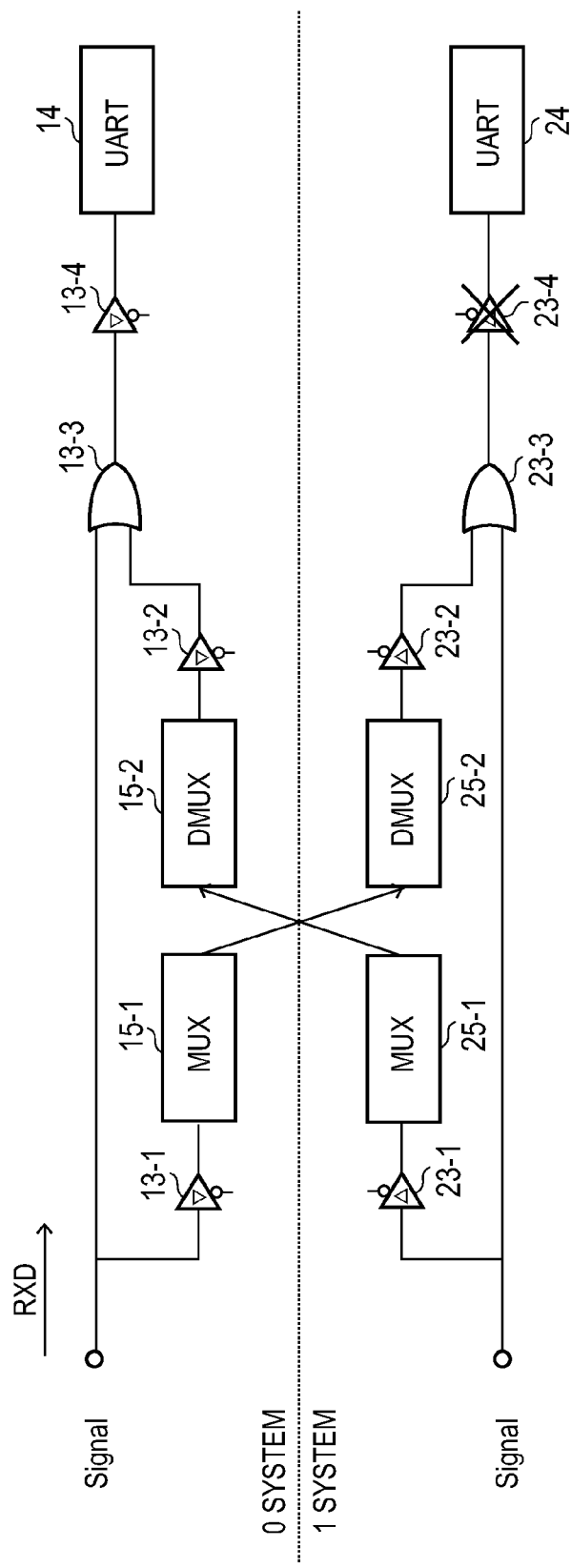
{FIG. 4} A view illustrates a condition 1 when the UART is on the receiving side.

Each of FIG. 4, FIG. 5, FIG. 6, and FIG. 7 is a view for illustrating a condition when the UART is on the receiving side. In each of the drawings, an x-mark on the gate denotes that the gate is opened (OFF). When a mark is not put on the gate, it is denoted that the gate is closed (ON). FIG. 4 is a view for illustrating a condition 1. Only the gate 23-4 is opened. In the condition 1, for example, the 0 system operate as the operation system and the 1 system operate as the standby system. Even if the RS232-C connection equipment 10 illustrated in FIG. 1 is connected to either of the operation system or the standby system, the UART 14 can receive the RS232-C signals from the connection equipment. It is because that the OR circuit 13-3 implements the OR operation.

Figure 5:
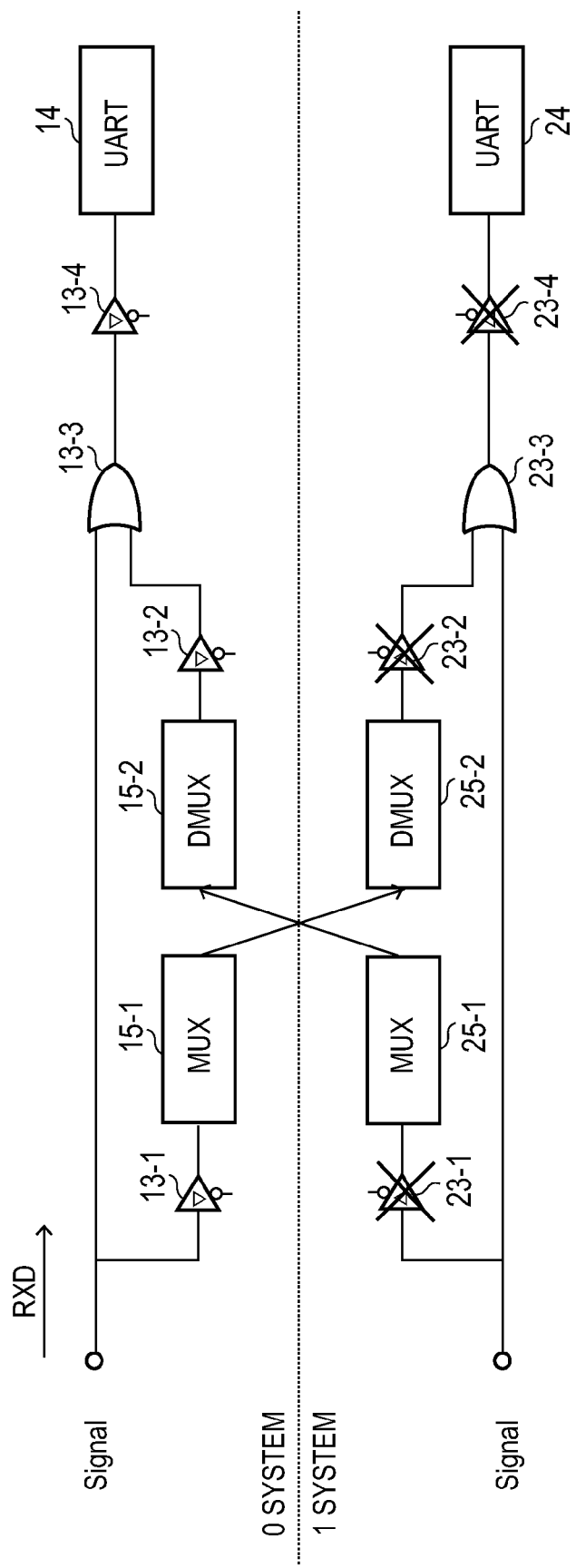
{FIG. 5} A view illustrates a condition 2 when the UART is on the receiving side.

FIG. 5 is a view for illustrating a condition 2. In the condition 2, the gates 23-1 and 23-2 are opened and the other gates are closed. In the condition 2, the 0 system operates as the operation system and the 1 system operate as a maintenance system (under maintenance). However, the gates 23-1 and 23-21 are opened. Thus, the connection equipment is connected to the 1 system (maintenance system) and the 1 system becomes an independent system so that, for example, a connection test can be performed while the 1 system does not interrupt the operation of the 0 system (the operation system). The operation under maintenance will be described below.

Figure 6:
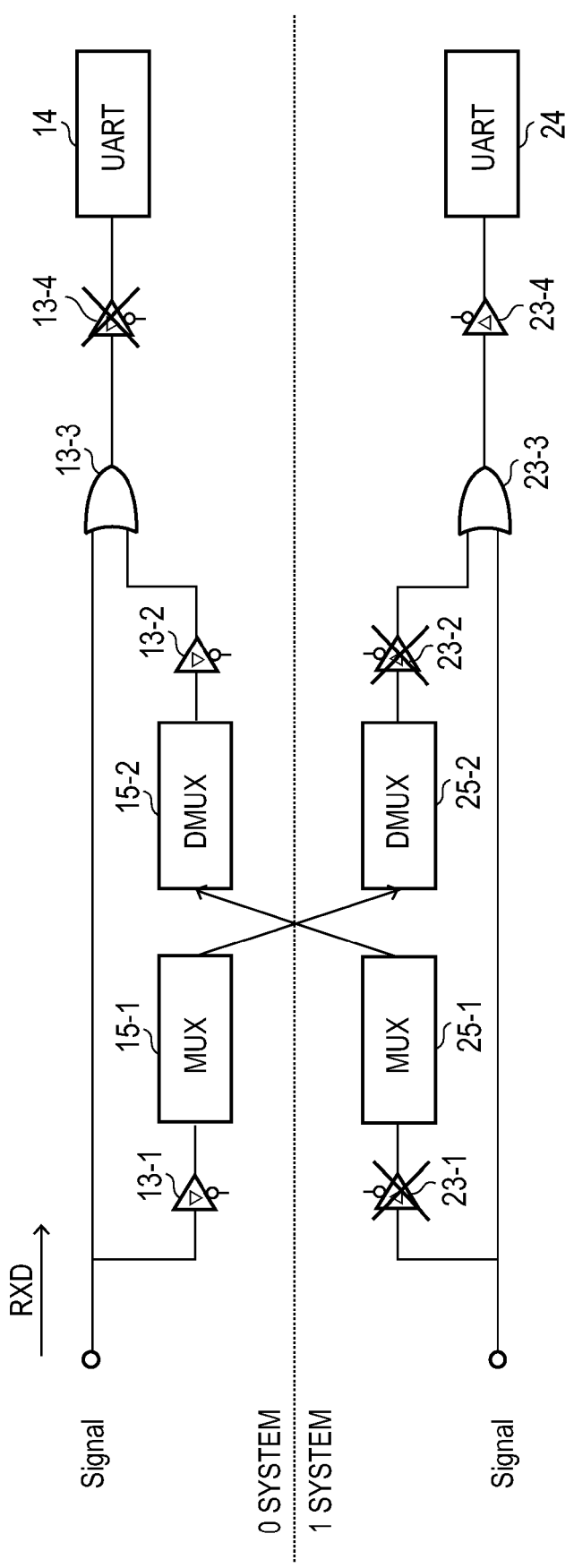
{FIG. 6} A view illustrates a condition 3 when the UART is on the receiving side.

FIG. 6 is a view for illustrating a condition 3. In the condition 3, the gates 13-4, 23-1, and 23-2 are opened and the other gates are closed. In the condition 3, the 0 system is the standby system and the 1 system is the maintenance system (under maintenance). Both of the systems do not operate. In that condition, the above-mentioned connection test or the like can be performed in the 1 system (the maintenance system) without affecting the 0 system (the standby system).

Figure 7:
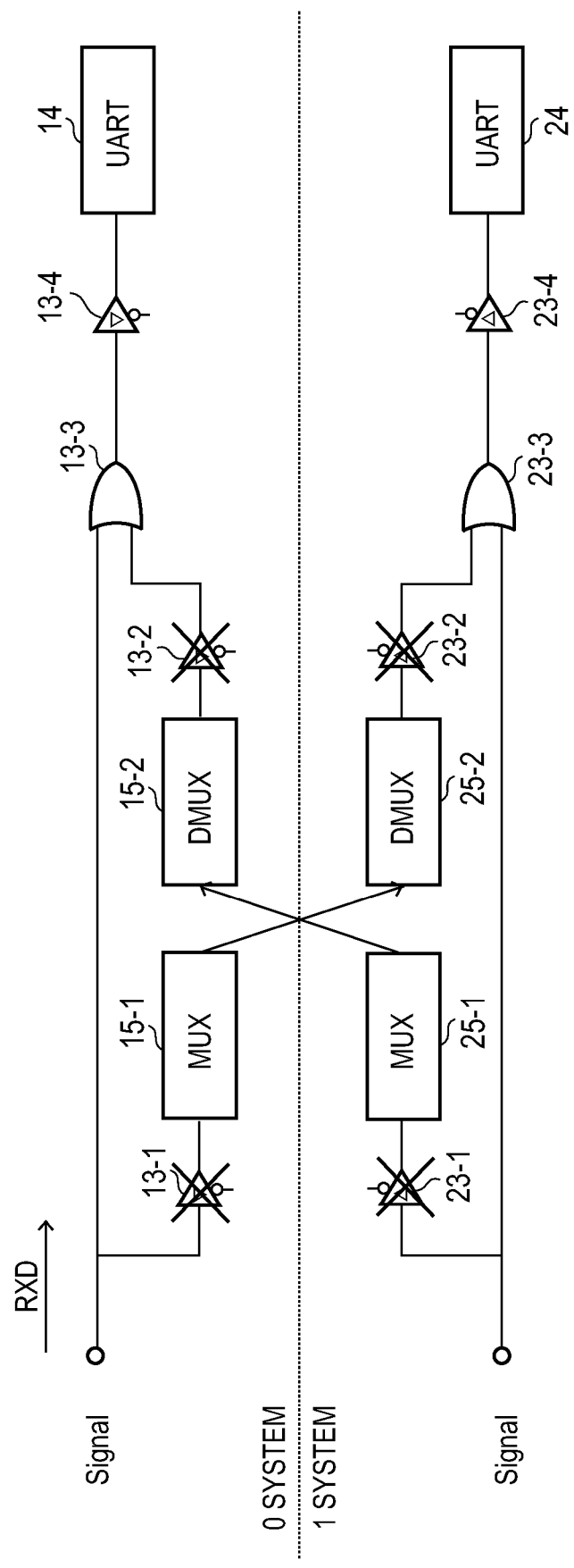
{FIG. 7} A view illustrates a condition 4 when the UART is on the receiving side.

FIG. 7 is a view for illustrating a condition 4. In the condition 4, the gates 13-1, 13-2, 23-1, and 23-2 are opened and the other gates are closed. In the condition 4, both of the 0 system and the 1 system are the maintenance systems (under maintenance). Both of the systems do not operate so that the above-mentioned connection test or the like can be independently performed in each of the 0 system and the 1 system.

Figure 8:
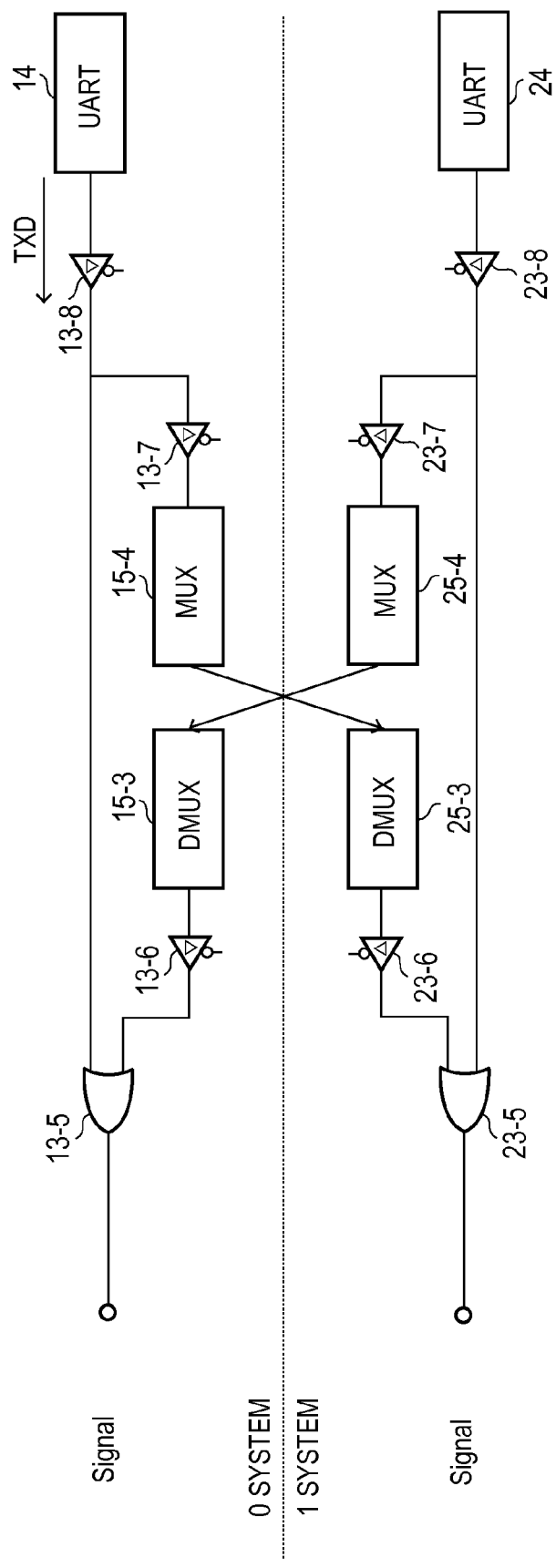
{FIG. 8} A view illustrates the connecting condition of the UART when the UART is on the transmitting side.

FIG. 8 is a view for illustrating the selector and the multiplexer/demultiplexer of each of the 0 system and the 1 system when the UART is on the transmitting side, in detail. In other words, FIG. 8 is a view for illustrating the connecting condition of the UART when the UART is on the transmitting side. In the drawing, the numerical references 13-6, 13-7, and 13-8 denote the gates in the selector of the 0 system, and the numerical reference 13-5 denotes an OR circuit.

The numerical references 23-6, 23-7, and 23-8 denote the gates in the selector 23 of the 1 system, and the numerical reference 23-5 denotes an OR circuit. The numerical reference 15-3 denotes a demultiplexer in the multiplexer/demultiplexer 15 of the 0 system and 15-4 denotes a multiplexer. The numerical reference 25-4 denotes a multiplexer in the multiplexer/demultiplexer 25 of the 1 system and 25-3 denotes a demultiplexer.

Each of FIG. 9, FIG. 10, FIG. 11, and FIG. 12 is a view for illustrating a condition when the UART is on the transmitting side. An x-mark on the gate denotes that the gate is opened (OFF). When a mark is not put on the gate, it is denoted that the gate is closed (ON). Note that the UARTs are on the transmitting side in FIGS. 9 to 12 so that the operations are in the opposite direction to the operations illustrated in FIGS. 4 to 7 when the UARTs are on the receiving side.

Figure 9:
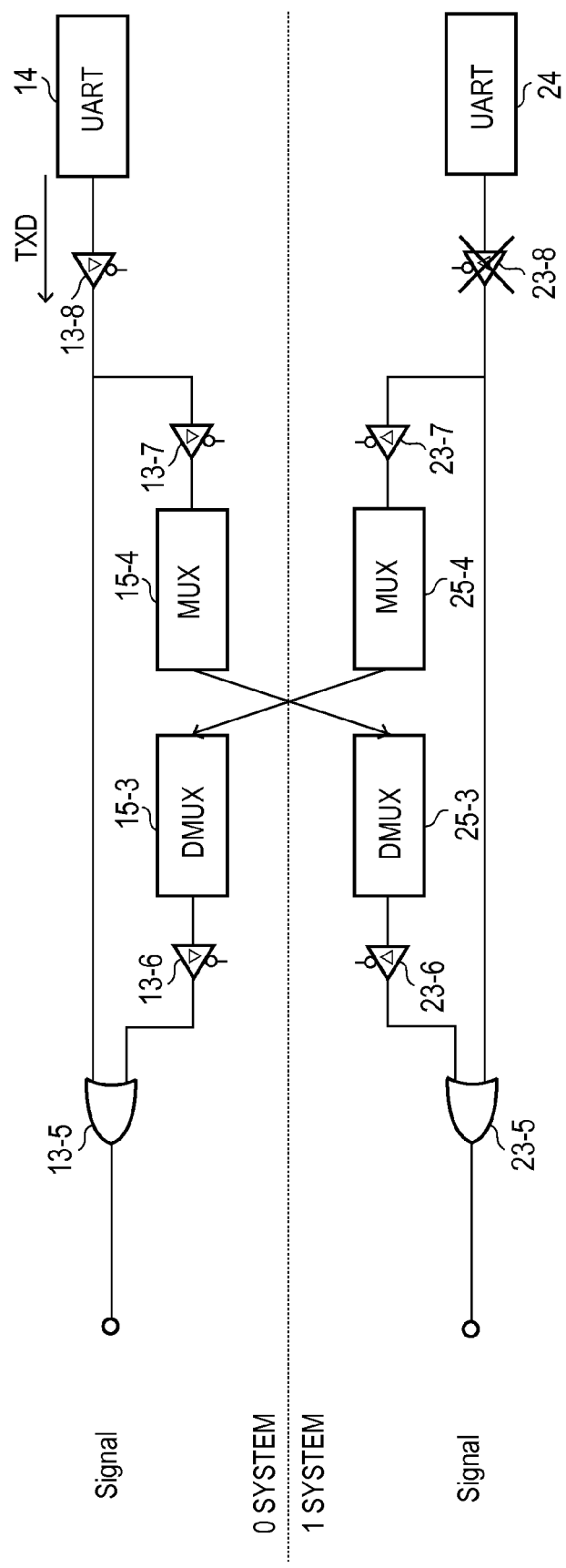
{FIG. 9} A view illustrates a condition 1 when the UART is on the transmitting side.

FIG. 9 is a view for illustrating a condition 1. Only the gate 23-8 is opened. In the condition 1, for example, the 0 system operate as the operation system and the 1 system operate as the standby system. Even if the RS232-C connection equipment 10 illustrated in FIG. 1 is connected to either of the operation system or the standby system, the UART 14 can transmits signals to either of the equipments. It is because that the OR circuits 13-5 and 23-5 implement the OR operations.

Figure 10:
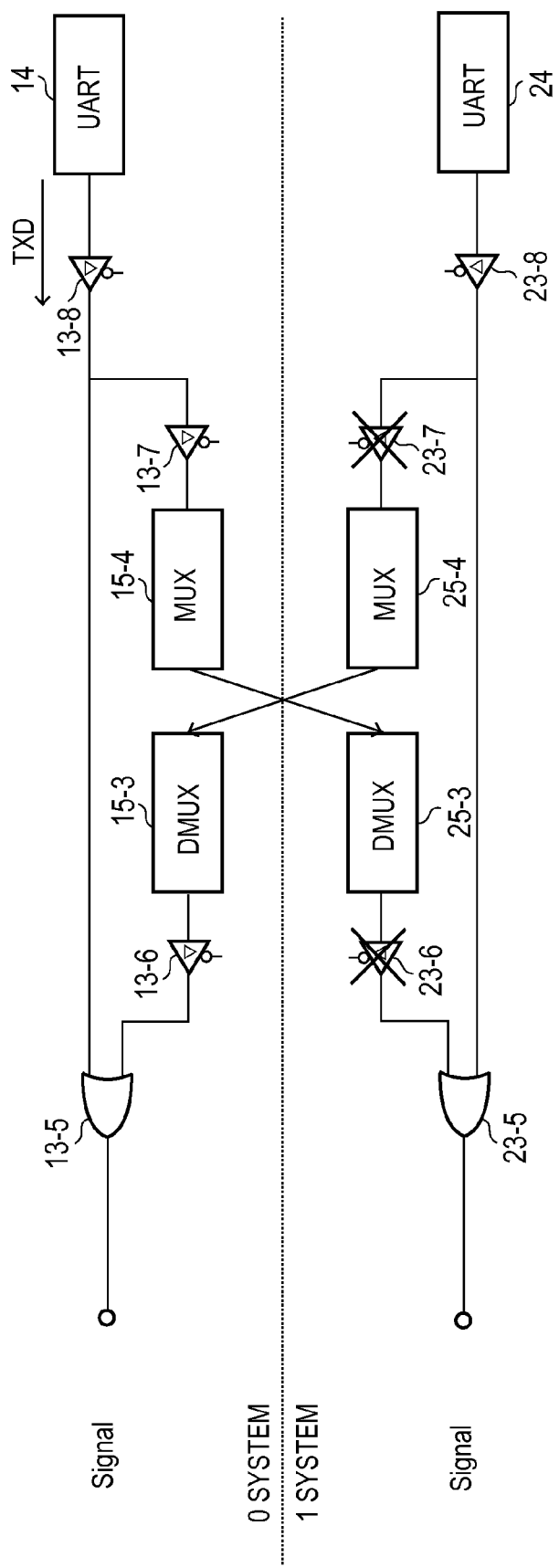
{FIG. 10} A view illustrates a condition 2 when the UART is on the transmitting side.

FIG. 10 is a view for illustrating a condition 2. In the condition 2, the gates 23-6 and 23-7 are opened and the other gates are closed. In the condition 2, the 0 system operates as the operation system and the 1 system operate as a maintenance system (under maintenance). The connection equipment is connected to the 1 system (maintenance system) and the 1 system becomes an independent system so that, for example, a connection test can be performed in the 1 system (maintenance system) while the operation of the 0 system (the operation system) is not interrupted.

Figure 11:
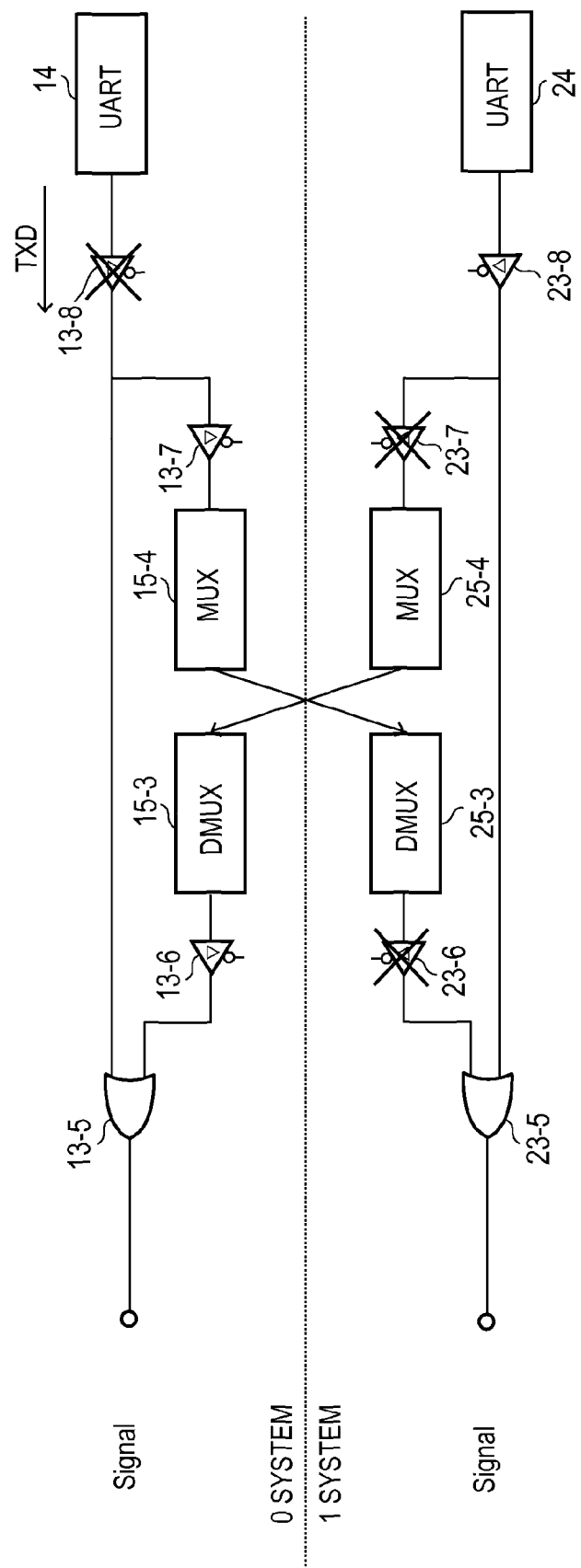
{FIG. 11} A view illustrates a condition 3 when the UART is on the transmitting side.

FIG. 11 is a view for illustrating a condition 3. In the condition 3, the gates 13-8, 23-6, and 23-7 are opened and the other gates are closed. In the condition 3, the 0 system becomes the standby system and the 1 system becomes the maintenance system (under maintenance). Both of the systems do not operate. In that condition, the above-mentioned connection test or the like can be performed in the 1 system (the maintenance system) without affecting the 0 system (the standby system).

Figure 12:
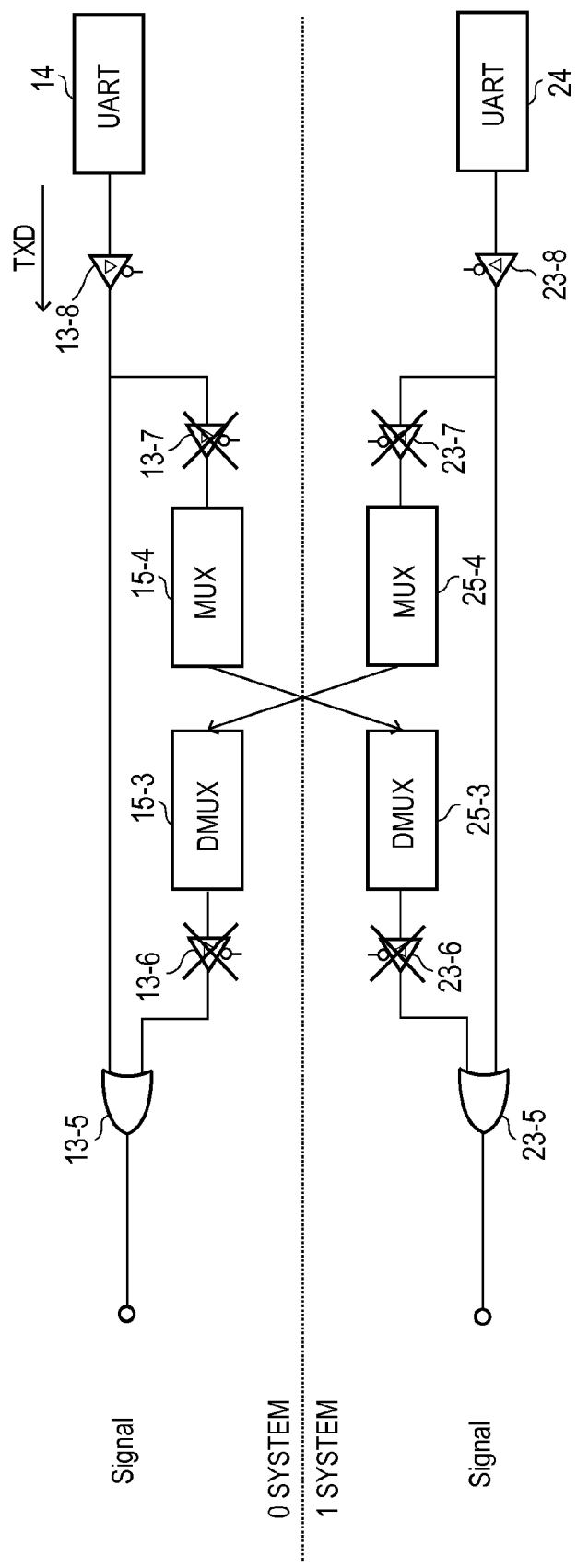
{FIG. 12} A view illustrates a condition 4 when the UART is on the transmitting side.

FIG. 12 is a view for illustrating a condition 4. In the condition 4, the gates 13-6, 13-7, 23-6, and 23-7 are opened and the other gates are closed. In the condition 4, both of the 0 system and the 1 system become the maintenance systems (under maintenance). Both of the systems do not operate so that the above-mentioned connection test or the like can be independently performed in each of the 0 system and the 1 system.

Next, the embodiment of the present invention will be described in further detail.

(1) According to the embodiment of the present invention, when the RS232-C signals of the operation system are connected to the standby system, the sampling is performed at a higher sampling rate than the RS232-C communication rate to convert the data and the control signals into serial data. This can reduce the number of the signal lines (seven→four).

According to the embodiment of the present invention, it is not necessary to perform a data synchronization by a start bit detection because the received data are transmitted to the standby system without any change when a parallel to serial conversion is performed in the multiplexer/demultiplexer. All of the data (the data and the control signals) are just only converted from serial to parallel data or from parallel to serial data. Thus, the conversion is performed regardless of the start bit detection. The start bit is detected by the UART as usual.

(2) According to the embodiment of the present invention, the RS232-C signals of a plurality of (two or more) ports in the operation system are multiplexed and are connected to the standby system. This can reduce the number of the signal lines (seven×the number of the ports→four).

In other words, each of the operation system and the standby system includes, for example, the two RS232-C ports (#A and #B in FIG. 2). In FIG. 1, each of the units includes two sets of an input and output connector, an RS232-C driver, the selector, and the UART. Note that the input and output connector of the second port is omitted in FIG. 1.

Each of the multiplexed signals #A and #B illustrated in FIG. 2 is the RS232-C signal of each port. In FIG. 2, the data of the two ports (seven bits×2) are multiplied frame by frame to transmit and receive the signals of the two ports. The signals of the two ports have been input in the multiplexer. A frame includes 18 clocks. The present scheme is not necessary to provide a signal line between the multiplexed units for each port of the RS232-C. This can reduce the number of signal lines.

(3) According to the embodiment of the present invention, the sampling rate of the multiplexer for converting the RS232-C signals into a serial format is set as 16 times the RS232-C communication rate×the number of the transmitted and received bits, or as an integral multiple thereof (the baud rate×16×the number of the transmitted and received bits×N).

In other words, when the operation system is connected to the standby system, the baud rate of the above-mentioned example is 38.4 Kbps or less. The sampling rate at the maximum baud rate of the above-mentioned example: 38.4 Kbps× 16 times×18=11.0592 Mbps. The UART usually samples the RS232-C signal in clocks that are 16 times as many as the RS232-C communication rate to receive the signals.

The multiplexer samples the signals input to the UART of the operation system in clocks that are 16 times as many as the communication rate×N times to multiplex the signals. This can reproduce the waveform at shorter time intervals than that of the sampling by the UART of the standby system. When the communication rate is slow, the sampling is performed at the N times speed. This reproduces a more accurate waveform.

Note that when the baud rate is 38.4 Kbps, the clocks are 16 times as many as the RS232-C communication rate. When the baud rate is 19.2 Kbps, the clocks are 16×2=32 times (twice) as many as the RS232-C communication rate. When the baud rate is 9.6 Kbps, the clocks are 16×4=64 times (four times) as many as the RS232-C communication rate. In the above-mentioned example, the clocks are set as the clocks when the baud rate is 38.4 Kbps, the clocks that are twice as many as the clocks when the baud rate is 38.4 Kbps, or the clocks that are four times as many as the clocks when the baud rate is 38.4 Kbps. The value of 11.0592 Mbps/18 is dividable by each of the clocks. However, the sampling can be performed in a high number of clocks. The sampling can be performed in the clocks that are three times or five times as many as the clocks when the baud rate is 38.4 Kbps. Thus, the clock is set as an integral multiple of the clocks when the baud rate is 38.4 Kbps. Further, in the sampling method of the example illustrated in FIG. 2, each of the RS-232C signals is sampled on the transmitted clock of 11.0592 Mbps in sequence. However, the RS232-C signal can be read at each of the frame heads.

(4) According to the embodiment of the present invention, the OR operation is implemented on the RS232-C signal from an RS232-C input port to the UART and the RS232-C signal from the other of the duplexed units. Thus, even if the RS232-C equipment is connected to either input port of the units, the unit can communicate with the RS232-C equipment.

As illustrated, for example, in FIG. 4, the 0 system is the initial operation system, and the 1 system is the initial standby system. When a malfunction occurs in the 0 system, the 1 system becomes the operation system and the 0 system becomes the standby system. Switches for connecting the UART (the gates illustrated in FIG. 4) are set at ON in the operation system and at OFF in the standby system.

The RS232-C equipment is connected to the input and output connector 11 of the operation system (the 0 system) at a normal operation so that the RS232-C signal from the input and output connector 11 of the 0 system is input to the UART 14 through the OR circuit 13-3. In this case, the RS232-C equipment is not connected to the input and output connector 21 of the 1 system (the standby system) so that the signal is input only from the input and output connector 11 of the 0 system.

On the other hand, when a malfunction occurs in the 0 system, the 0 system becomes the standby system and the 1 system becomes the operation system. The switches in the 0 system are set at OFF and the switches in the 1 system are set at ON. In that condition, the RS232-C signal of the RS232-C equipment connected to the input and output connector 11 of the standby system (the 0 system) is input to the UART 24 of the operation system (the 1 system) through the OR circuit 23-3 of the operation system (the 1 system). The 1 system unit can communicate with the RS232-C equipment connected to the 0 system in which the malfunction occurs.

At that time, even if the connection of the RS232-C equipment 10 to the standby system (the 0 system) is switched to the input and output connector of the operation system (the 1 system), the RS232-C signal from the input and output connector of the 1 system is input to the UART 24 of the operation system (the 1 system) through the OR circuit 23-3 (see FIG. 4).

As described above, the OR operation is implemented on the signal from the RS232-C connector and the RS232-C signal from the other unit in order to input the signal to the UART. Thus, when a malfunction occurs, the RS232-C equipment connected to the 0 system unit in which the malfunction occurs can continuously communicate with the UART of the new operation system (the 1 system). Further, when the 0 system unit is repaired (maintained), the connection of the RS232-C equipment to the original operation system (the 0 system) is merely switched to the new operation system (the 1 system) so that the UART of the new operation system (the 1 system) can receive the signal (Note that the equipment cannot simultaneously be connected to both of the 0 system and the 1 system).

(5) According to the embodiment of the present invention, the setting for the connection to the own CPU prevents the input from the other unit of the duplexed unit, and causes the unit set to connect to the own CPU to communicate with The RS232-C equipment connected to the unit connected to the CPU. Each of the operation system unit and the standby system unit is set at "follow the ACT/STBY setting" or "do not follow the ACT/STBY setting (connect to the own CPU)". When the RS232-C signal is automatically switched, both of the units are normally set at "follow the ACT/STBY setting".

As described above, FIG. 3 is a view for illustrating the connecting condition of the UART when the UART is on the receiving side and FIG. 8 is a view for illustrating the connecting condition of the UART when the UART is on the transmitting side (the RS232-C transceiver and the like are omitted in FIG. 3). Further, each of FIGS. 4 to 7 is a view for illustrating a condition when the UART is on the receiving side.

When both of the 0 system unit and the 1 system unit are set at "follow the ACT/STBY setting", the RS232-C equipment connected to the operation system (the 0 system) communicates with the UART 14 of the 0 system and with the standby system (the 1 system) as illustrated in FIG. 4 because the gates 23-1 and 23-2 are ON. Note that the signal is not input to the UART 24 of the 1 system because the gate 23-4 of the 1 system is OFF.

When the operation system is switched from the 0 system to the 1 system at the condition, the gate 13-4 of the 0 system becomes OFF and the gate 23-4 of the 1 system becomes ON. At that time, the gate 13-1 of the 0 system and the gates 23-2, 23-1, and 23-2 of the 1 system are ON. Thus, the RS232-C equipment connected to the input and output connector of the 0 system can communicate with the UART of the 1 system.

Further, at the condition illustrated in FIG. 4, the RS232-C input and output connector of the standby system (the 1 system) is not connected to the UART 24 of the standby system (the gate 23-4 of the 1 system is OFF). Thus, the RS232-C input and output connector of the standby system (the 1 system) cannot communicate with the RS232-C equipment connected to the standby system. In this case, the standby system (the 1 system) is set at "do not follow the ACT/STBY setting (connect to the own CPU)" so that the gates 23-1 and 23-2 of the 1 system become OFF and the gate 23-4 becomes ON as illustrated in FIG. 5. Thus, the RS232-C equipment connected to the standby system (the 1 system) is connected to the UART of the standby system and can communicate with the UART of the standby system (a function for maintenance). FIG. 5 is a view for illustrating an example where the 1 system becomes a function for maintenance.

In this case, normally, for example, when data are registered in the standby system unit while the 0 system operates as the operation system (ACT) and the 1 system operate as the standby system (STBY), and the RS232-C equipment is connected to the operation system (the 0 system), the RS232-C equipment (for example, a data registering equipment) is not connected to the UART of the standby system even if the equipment is connected to the RS232-C input and output connector of the standby system.

In that case, according to the embodiment of the present invention, setting the 1 system at "do not follow the ACT/STBY setting (connect to the own CPU)" connects the RS-232C equipment to the input and output connector of the operation system (the 0 system). Thus, even if the equipment communicates with the UART of the operation system (the 0 system), a data registering device connected to the RS232-C connector of the standby system (the 1 system) is connected to the UART of the standby system (the 1 system). Thus, the data setting in the standby system (the 1 system) can be performed.

Note that, for the initial setting or the like, setting both of the 0 system unit and the 1 system unit at "do not follow the ACT/STBY setting (connect to the own CPU)" can implement a data setting with connecting the data registering device to both of the units (the condition illustrated in FIG. 7). Note that each of the gates 13-2 and 23-2 illustrated, for example, in FIG. 4 is positioned between the multiplexer and the OR circuit to turn the input to the OR circuit ON/OFF.

According to the technique described in Patent Literature 1, as described above, the transmitting and receiving device connected to the operation system unit (operation system switch) can process the signal received from the equipment connected to the operation system unit (operation system switch) and the signal to be transmitted to the equipment connected to the operation system unit (operation system switch). However, the transmitting and receiving device mounted on the operation system unit (operation system switch) cannot process the signal received from the equipment connected to the standby system unit (backup system switch) and the signal to be transmitted to the equipment connected to the standby system unit (backup system switch). Neither does the technique described in Patent Literature 2.

If such a process can be done, the equipment connected to the previous operation system unit can continuously be used without connecting the equipment to the new operation system unit (the previous standby system unit) when the standby system unit switches places with the operation system unit. Thus, it is not necessary to switch the destination every time when the operation system units switch places with each other. This improves the maintainability.

According to the present embodiment, the transmitting and receiving device mounted on the operation system unit can process not only the signal received from the equipment connected to the operation system unit and the signal to be transmitted to the equipment connected to the operation system unit but also the signal received from the equipment connected to the standby system unit and the signal to be transmitted to the equipment connected to the standby system unit.

According to the present embodiment, even if each of the operation system unit and the standby system unit is provided with a plurality of equipments, the process can be performed.

Further, the above-mentioned embodiment is a preferred embodiment of the present invention. However, the scope of the present invention is not limited to the above-mentioned embodiment. Various modifications of the embodiment can be implemented without departing from the gist of the invention.

The present application is based on Japanese Patent Application JP 2010-172043 (filed on Jul. 30, 2010), and claims a priority under the Paris convention which is based on Japanese Patent Application JP 2010-172043. The entire content of Japanese Patent Application JP 2010-172043 is hereby incorporated by reference.

It should be understood that various changes, substitutions, and alternatives will occur without departing from the spirit and the scope of the invention defined in the claims although the representative embodiment of the present invention has been described in detail. Further, even if the claims should be amended in the application procedure, the inventor could intend to maintain the equivalent scope to the claimed invention.

A part or the entire of the above-mentioned embodiment can also be described as the following appendixes, but not limited to the configurations below.

(Appendix 1) A transmitting and receiving system for transmitting and receiving a data signal and a control signal between an operation system unit and a standby system unit, comprising:

a multiplexer included in the operation system unit;
a demultiplexer included in the operation system unit;
a multiplexer included in the standby system unit;
a demultiplexer included in the standby system unit;
a circuit configured to perform a parallel/serial conversion on a data signal and a control signal using the multiplexer of the standby system unit to multiplex the signals in order to transmit the signals as a serial received signal from the standby system unit to the operation system unit, and configured to perform a serial/parallel conversion on the signal using the demultiplexer of the operation system unit to demultiplex the signal, the data signal and the control signal being to be received by the standby system unit from an equipment connected to the standby system unit and being to be transmitted to a receiving device in the operation system unit; and a circuit configured to perform a parallel/serial conversion on a data signal and a control signal using the multiplexer of the operation system unit to multiplex the signals in order to transmit, from the operation system unit to the standby system unit, the signals as a serial signal to be transmitted, and configured to perform a serial/parallel conversion on the signal using the demultiplexer of the standby system unit to demultiplex the signal, the data signal and the control signal being to be input from a transmitting device of the operation system unit and being to be transmitted to the equipment connected to the standby system unit.

(Appendix 2) The transmitting and receiving system according to the Appendix 1, wherein a plurality of equipments is connected to each of the operation system unit and the standby system unit and the number of the equipments connected to the operation system unit is the same as the number of the equipments connected to the standby system unit, and each of the multiplexer of the operation system unit, the multiplexer of the standby system unit, the demultiplexer of the operation system unit, and the demultiplexer of the standby system unit processes signals transmitted and to be received by the plurality of equipments.

(Appendix 3) The transmitting and receiving system according to the Appendix 1 or 2 further comprising:

a circuit configured to supply, to the receiving device in the operation system unit, the data signal and the control signal received by the operation system unit from the equipment connected to the operation system unit; and a circuit configured to transmit, to the equipment connected to the operation system unit, the data signal and the control signal input from the transmitting device of the operation system unit.

(Appendix 4) The transmitting and receiving system according to the Appendix 3 further comprising:

a circuit configured to prevent a supply, to the receiving device in the operation system unit, the data signal and the control signal received by the standby system unit from the equipment connected to the standby system unit;

a circuit configured to prevent a supply, to the receiving device in the standby system unit, the data signal and the control signal received by the operation system unit from the equipment connected to the operation system unit;

a circuit configured to supply, to the receiving device in the standby system unit, the data signal and the control signal received by the standby system unit from the equipment connected to the standby system unit;

a circuit configured to prevent a transmission of the data signal and the control signal input from the transmitting device in the standby system unit to the equipment connected to the operation system unit;

a circuit configured to prevent a transmission of the data signal and the control signal input from the transmitting device in the operation system unit to the equipment connected to the standby system unit; and a circuit configured to supply, to the equipment connected to the standby system unit, the data signal and the control signal input from the transmitting device in the standby system unit.

(Appendix 5) The transmitting and receiving system according to any of the Appendixes 1 to 4, wherein a baud rate×M×N, the M is an minimum power-of-two integer that is equal to or more than a value required for the serial received signal or the serial signal to be transmitted, the N is an integer that is one or more.

(Appendix 6) A transmitting and receiving method for transmitting and receiving a data signal and a control signal between an operation system unit and a standby system unit, the method comprising:

performing a parallel/serial conversion on a data signal and a control signal using a multiplexer of the standby system unit to multiplex the signals in order to transmit the signals as a serial received signal from the standby system unit to the operation system unit, and configured to perform a serial/parallel conversion on the signal using a demultiplexer of the operation system unit to demultiplex the signal, the data signal and the control signal being to be received by the standby system unit from an equipment connected to the standby system unit and being to be transmitted to a receiving device in the operation system unit; and performing a parallel/serial conversion on a data signal and a control signal using a multiplexer of the operation system unit to multiplex the signals in order to transmit, from the operation system unit to the standby system unit, the signals as a serial signal to be transmitted, and configured to perform a serial/parallel conversion on the signal using a demultiplexer of the standby system unit to demultiplex the signal, the data signal and the control signal being to be input from a transmitting device of the operation system unit and being to be transmitted to an equipment connected to the standby system unit.

(Appendix 7) The transmitting and receiving method according to the Appendix 6, wherein a plurality of equipments is connected to each of the operation system unit and the standby system unit and the number of the equipments connected to the operation system unit is the same as the number of the equipments connected to the standby system unit, and each of the multiplexer of the operation system unit, the multiplexer of the standby system unit, the demultiplexer of the operation system unit, and the demultiplexer of the standby system unit processes signals transmitted and to be received by the plurality of equipments.

(Appendix 8) The transmitting and receiving method according to the Appendix 6 or 7 further comprising:

supplying, to the receiving device in the operation system unit, the data signal and the control signal received by the operation system unit from the equipment connected to the operation system unit; and transmitting, to the equipment connected to the operation system unit, the data signal and the control signal input from the transmitting device of the operation system unit.

(Appendix 9) The transmitting and receiving method according to the Appendix 8 further comprising:

preventing a supply, to the receiving device in the operation system unit, the data signal and the control signal received by the standby system unit from the equipment connected to the standby system unit;

preventing a supply, to the receiving device in the standby system unit, the data signal and the control signal received by the operation system unit from the equipment connected to the operation system unit;

supplying, to the receiving device in the standby system unit, the data signal and the control signal received by the standby system unit from the equipment connected to the standby system unit;

preventing a transmission of the data signal and the control signal input from the transmitting device in the standby system unit to the equipment connected to the operation system unit;

preventing a transmission of the data signal and the control signal input from the transmitting device in the operation system unit to the equipment connected to the standby system unit; and supplying, to the equipment connected to the standby system unit, the data signal and the control signal input from the transmitting device in the standby system unit.

(Appendix 10) The transmitting and receiving method according to any of the Appendixes 6 to 9, wherein a baud rate×M×N, the M is an minimum power-of-two integer that is equal to or more than a value required for the serial received signal or the serial signal to be transmitted, the N is an integer that is one or more.

INDUSTRIAL APPLICABILITY

The present invention can preferably be used for a unit such as an exchange, a router, or an Ethernet (registered trademark) HUB that has a duplexed structure and includes an RS232-C interface (start/stop synchronization).

The invention claimed is:

1. A transmitting and receiving system that is provided in a duplexed system comprising an operation system unit and a standby system unit,
wherein when a malfunction occurs in the operation system unit, the standby system unit operates in place of the operation system unit, and the transmitting and receiving system comprises:
a multiplexer included in the operation system unit;
a demultiplexer included in the operation system unit;
a multiplexer included in the standby system unit;
a demultiplexer included in the standby system unit;
a circuit configured to: perform a parallel/serial conversion on a data signal and a control signal, which have been received by the standby system unit from an equipment connected to the standby system unit, using the multiplexer of the standby system unit to multiplex the signals into a first serial signal; transmit the first serial signal from the standby system unit to the operation system unit; and perform a serial/parallel conversion on the first serial signal using the demultiplexer of the operation system unit to demultiplex the first serial signal and supply the demultiplexed signals to a receiving device in the operation system unit, and
a circuit configured to: perform a parallel/serial conversion on a data signal and a control signal, which have been prepared by the operation system unit for transmitting the signals through the standby system unit to the equipment connected to the standby system unit, using the multiplexer of the operation system unit to multiplex the signals into a second serial signal; transmit, from the operation system unit to the standby system unit, the second serial signal; and perform a serial/parallel conversion on the second serial signal using the demultiplexer of the standby system unit to demultiplex the second serial signal and supply the demultiplexed signals to a transmitting device in the standby system unit.

2. The transmitting and receiving system according to claim 1,
wherein a plurality of equipments is connected to each of the operation system unit and the standby system unit and the number of the equipments connected to the operation system unit is the same as the number of the equipments connected to the standby system unit, and
each of the multiplexer of the operation system unit, the multiplexer of the standby system unit, the demultiplexer of the operation system unit, and the demultiplexer of the standby system unit processes signals transmitted and to be received by the plurality of equipments.

3. The transmitting and receiving system according to claim 1 further comprising:
a circuit configured to supply, to the receiving device in the operation system unit, the data signal and the control signal received by the operation system unit from the equipment connected to the operation system unit; and
a circuit configured to transmit, to the equipment connected to the operation system unit, the data signal and the control signal input from the transmitting device of the operation system unit.

4. The transmitting and receiving system according to claim 3 further comprising:
a circuit configured to prevent a supply, to the receiving device in the operation system unit, the data signal and the control signal received by the standby system unit from the equipment connected to the standby system unit;
a circuit configured to prevent a supply, to the receiving device in the standby system unit, the data signal and the control signal received by the operation system unit from the equipment connected to the operation system unit;
a circuit configured to supply, to the receiving device in the standby system unit, the data signal and the control signal received by the standby system unit from the equipment connected to the standby system unit;
a circuit configured to prevent a transmission of the data signal and the control signal input from the transmitting device in the standby system unit to the equipment connected to the operation system unit;
a circuit configured to prevent a transmission of the data signal and the control signal input from the transmitting device in the operation system unit to the equipment connected to the standby system unit; and
a circuit configured to supply, to the equipment connected to the standby system unit, the data signal and the control signal input from the transmitting device in the standby system unit.

5. The transmitting and receiving system according to claim 1,
wherein a sampling rate of the multiplexers of the operation system unit and the standby system unit is set as a baud rate×M×N,
the M is an minimum power-of-two integer that is equal to or more than a value required for the serial received signal or the serial signal to be transmitted,
the N is an integer that is one or more.

6. A transmitting and receiving method used in a duplexed system comprising an operation system unit and a standby system unit,
wherein when a malfunction occurs in the operation system unit, the standby system unit operates in place of the operation system unit, and the method comprises:
performing a parallel/serial conversion on a data signal and a control signal, which have been received by the standby system unit from an equipment connected to the standby system unit using a multiplexer of the standby system unit to multiplex the signals into a first serial signal; transmit the first serial signal from the standby system unit to the operation system unit; and perform a serial/parallel conversion on the first serial signal using a demultiplexer of the operation system unit to demultiplex the first serial signal and supply the demultiplexed signals to a receiving device in the operation system unit, and
performing a parallel/serial conversion on a data signal and a control signal, which have been prepared by the operation system unit for transmitting the signals through the standby system unit to the equipment connected to the standby system unit, using a multiplexer of the operation system unit to multiplex the signals into a second serial signal; transmitting, from the operation system unit to the standby system unit, the second serial signal; and performing a serial/parallel conversion on the second serial signal using a demultiplexer of the standby system unit to demultiplex the second serial signal and supply the demultiplexed signals to a transmitting device in the standby system unit.

7. The transmitting and receiving method according to claim 6,
wherein a plurality of equipments is connected to each of the operation system unit and the standby system unit and the number of the equipments connected to the operation system unit is the same as the number of the equipments connected to the standby system unit, and
each of the multiplexer of the operation system unit, the multiplexer of the standby system unit, the demultiplexer of the operation system unit, and the demultiplexer of the standby system unit processes signals transmitted and to be received by the plurality of equipments.

8. The transmitting and receiving method according to claim 6 further comprising:
supplying, to the receiving device in the operation system unit, the data signal and the control signal received by the operation system unit from the equipment connected to the operation system unit; and
transmitting, to the equipment connected to the operation system unit, the data signal and the control signal input from the transmitting device of the operation system unit.

9. The transmitting and receiving method according to claim 8 further comprising:
preventing a supply, to the receiving device in the operation system unit, the data signal and the control signal received by the standby system unit from the equipment connected to the standby system unit;
preventing a supply, to the receiving device in the standby system unit, the data signal and the control signal received by the operation system unit from the equipment connected to the operation system unit;
supplying, to the receiving device in the standby system unit, the data signal and the control signal received by the standby system unit from the equipment connected to the standby system unit;
preventing a transmission of the data signal and the control signal input from the transmitting device in the standby system unit to the equipment connected to the operation system unit;
preventing a transmission of the data signal and the control signal input from the transmitting device in the operation system unit to the equipment connected to the standby system unit; and
supplying, to the equipment connected to the standby system unit, the data signal and the control signal input from the transmitting device in the standby system unit.

10. The transmitting and receiving method according to claim 6,
wherein a sampling rate of the multiplexers of the operation system unit and the standby system unit is set as a baud rate×M×N,
the M is a minimum power-of-two integer that is equal to or more than a value required for the serial received signal or the serial signal to be transmitted,
the N is an integer that is one or more.

* * * * *